(12) United States Patent
Renner et al.

(10) Patent No.: US 12,117,412 B2
(45) Date of Patent: Oct. 15, 2024

(54) ION MOBILITY SPECTROMETER AND METHOD FOR OPERATING THE SAME

(71) Applicant: Bruker Optik GmbH, Ettlingen (DE)

(72) Inventors: Uwe Renner, Leipzig (DE); Wolfgang Heller, Leipzig (DE); Achim Beyer, Brandis (DE); Stoyo Dobrianov, Leipzig (DE)

(73) Assignee: Bruker Optik GmbH, Ettingen (DE)

( * ) Notice: Subject to any disclaimer, the term of this patent is extended or adjusted under 35 U.S.C. 154(b) by 383 days.

(21) Appl. No.: 17/505,137

(22) Filed: Oct. 19, 2021

(65) Prior Publication Data

US 2022/0178861 A1    Jun. 9, 2022

(30) Foreign Application Priority Data

Dec. 9, 2020  (DE) .......................... 102020132852.4

(51) Int. Cl.
*G01N 27/22*    (2006.01)

(52) U.S. Cl.
CPC .................................... *G01N 27/22* (2013.01)

(58) Field of Classification Search
CPC ...... G01N 27/22; G01N 27/68; G01N 27/622; G01N 27/623; H01J 49/02; H01J 49/10; H01J 49/0027; H01J 49/0031; H01J 49/061; H01J 49/168; H01J 49/422
See application file for complete search history.

(56) References Cited

U.S. PATENT DOCUMENTS

| 10,741,373 | B2 | 8/2020 | Zimmermann et al. |
| 2006/0192103 | A1* | 8/2006 | Landgraf ............. G01N 27/622 250/287 |
| 2008/0251712 | A1 | 10/2008 | Sanders et al. |

(Continued)

FOREIGN PATENT DOCUMENTS

| CN | 101113968 A | 1/2008 |
| CN | 105353023 A | 2/2016 |

(Continued)

OTHER PUBLICATIONS

German Office Action dated Jul. 29, 2021 in connection with German Application No. 10 2020 132 852.4.

(Continued)

*Primary Examiner* — David E Smith
*Assistant Examiner* — Hsien C Tsai
(74) *Attorney, Agent, or Firm* — Norris McLaughlin, P.A.

(57) ABSTRACT

Ion mobility spectrometers and methods for determining an ion mobility spectrum of a sample are provided. The ion mobility spectrometers comprise a drift chamber and a cylindrical reaction chamber, wherein the drift chamber is designed to transport ions from a switching grid to an ion detector against an axial drift gas flow. The reaction chamber has a sample gas inlet adjacent to the switching grid for introducing a sample gas, a gas outlet opposite the switching grid for discharging drift gas and sample gas, and a local ionisation source arranged at the gas outlet. The sample gas inlet comprises gas inlets arranged oppositely on an inner circumference of the reaction chamber. The methods operate the ion mobility spectrometers to determine an ion mobility spectrum of a sample.

15 Claims, 6 Drawing Sheets

(56) References Cited

U.S. PATENT DOCUMENTS

| | | | | |
|---|---|---|---|---|
| 2008/0272285 | A1* | 11/2008 | Giannantonio | H01J 49/168 250/281 |
| 2011/0036977 | A1* | 2/2011 | Denton | G01N 27/622 250/283 |
| 2012/0068063 | A1 | 3/2012 | Fernandez et al. | |
| 2015/0129760 | A1 | 5/2015 | Beil et al. | |
| 2017/0241952 | A1 | 8/2017 | Atkinson et al. | |
| 2018/0224401 | A1 | 8/2018 | Zimmermann et al. | |
| 2021/0164939 | A1 | 6/2021 | Zimmermann et al. | |

FOREIGN PATENT DOCUMENTS

| | | |
|---|---|---|
| CN | 110828283 A | 2/2020 |
| DE | 10 2015 112 869 A1 | 2/2017 |
| DE | 10 2018 107 910 A1 | 10/2019 |

OTHER PUBLICATIONS

Coy et al., entitled: "A Gapless Micro-Dielectric-Barrier-Discharge Ion Source for Analytical Applications", ArXiv e-prints, 2016, pp. 1-34, accessible at http://arxiv.org/abs/1602.06242.

Pages 2-3 of European Search Report dated Apr. 29, 2022, in connection with European Application No. 21197490.

Fernandez-Maestre, "Accuracy of reduced mobilities and measurement of instrumental parameters in ion mobility spectrometry", International Journal of Mass Spectrometry, vol. 421, pp. 8-13, 2017.

Guharay et al., "Ion Mobility Spectrometry: Ion Source Development and Applications in Physical and Biological Sciences", IEEE Transactions on Plasma Science, vol. 36, No. 4, pp. 1458-1470, Aug. 2008.

Hauschild et al., "Peak Detection Method Evaluation for Ion Mobility Spectrometry by Using Machine Learning Approaches", Metabolites, vol. 3, No. 2, pp. 277-293, Apr. 2013.

Vasiliev, "Calibration Method for Ion Mobility Spectrometer", International Conference on Nanotechnologies and Biomedical Engineering, pp. 234-235, Jul. 2011.

Waraksa et al., "Dopants and gas modifiers in ion mobility spectrometry", Trac Trends in Analytical chemistry, vol. 82, pp. 237-249, 2016.

Chinese Office Action and English translation dated Jun. 15, 2024, in connection with Chinese Application No. 202111465083.8.

* cited by examiner

ION MOBILITY SPECTROMETER AND METHOD FOR OPERATING THE SAME

This application claims foreign priority benefit under 35 U.S.C. § 119 of German Application No. 10 2020 132 852.4, filed Dec. 9, 2020.

FIELD OF THE DISCLOSURE

The present invention relates to an ion mobility spectrometer, in particular a mobile ion mobility spectrometer with improved sample gas supply, as well as a method for operating an ion mobility spectrometer, in particular for calibrating said ion mobility spectrometer for reference-based measurement of the ion mobility of a sample.

TECHNICAL BACKGROUND

An ion mobility spectrometer is an instrument for characterising ions on the basis of their mobility in a drift medium under the action of an electromagnetic force. An ion mobility spectrometer usually has a reaction chamber and an adjacent drift chamber. The reaction chamber serves here to ionise the sample material and to form product ions, and the drift chamber serves to determine the flight time or drift time of the ions formed.

The sample enters the reaction chamber via inlets and by means of a carrier gas and is ionised there by energy supply. The formed ions are guided by electric field action into the drift chamber, which is bounded, for example, on the inlet side by a grid as ion modulator and on the opposite side by a detector unit for ion flow measurement. In the drift chamber, the ions are moved towards the detector by further field action. A drift medium with defined physical-chemical properties contained in the drift chamber interacts with the ions and counteracts the movement of the ions mediated by the field effect. The transport of the ions in the drift chamber thus depends on the electric field strength as well as the interaction with the drift gas and can be characterised by the resulting drift velocity.

The ion mobility K is thus a measure of the molecular friction of an ion in a given drift medium under the effect of an electromagnetic force and is all the greater, the smaller this friction is. The ion mobility K is determined as a proportionality factor between the drift velocity v and the electric field component E that is effective in the direction of drift. In a first approximation, these variables have the following linear relationship $$v = K * E. \quad (1)$$

Provided that the properties of the drift medium in the drift chamber are homogeneous and the electric field in the drift region of the ions is constant, the ion mobility over a given path L is determined by determining the drift time t and the voltage difference U between the end and the start of the drift path on the basis of the following equation derived from (1):

$$K = L^2 / (U * t). \quad (2)$$

The ion mobility K determined in this way always relates to a set drift medium and is not a specific constant of a particular ion. Rather, the value of the ion mobility is dependent on the interaction of the ion with the drift medium. If this interaction is assumed to be a collision process, its strength depends, according to the kinetic gas theory, on the mass of the collision partners involved, particle number density, pressure and temperature of the drift medium and the cross-section of action of the ion with the molecules of the drift gas.

For ion mobility spectrometers used under atmospheric conditions, the range of values of the particle number density of the drift gas, which in turn depends on its temperature T and pressure p, extends over a wide range. For example, for the (absolute) temperature T a range from −30° C. to +60° C. and for the pressure a range from 50 kPa to 110 kPa is possible. The dependence of the ion mobility on the particle number density is therefore eliminated by conversion to a normalised ion mobility. Even the normalised ion mobility $K_0(T)$, however, is temperature-dependent due to the dependence on the temperature-dependent cross-section of action of the particular interaction.

When determining the ion mobility, it is therefore usually assumed that the drift medium has homogeneous and has constant physical-chemical properties. However, if air is used as the drift medium, for example, the proportion of water present in it can already significantly influence the value of the ion mobility. Therefore, dry air, preferably with an absolute water concentration of less than 100 ppm, should be used as a drift medium. Filter systems are usually used for this purpose.

In order for the drift medium to maintain its defined physical-chemical properties, it is also continuously renewed in the drift chamber by a gas flow. In other words, a continuous drift gas flow flows through the drift chamber, and the gas flow is determined by integrating the gas flow density over the cross-sectional area through which the gas flows. The gas flow density in this case is the product of gas concentration and gas velocity. The gas flow in the drift chamber is superimposed on the ion flow and can in principle influence the effective drift time. However, the drift gas velocity of, for example, 4 cm/s is significantly smaller compared to the drift velocity of the ions of, for example, 4 m/s and is therefore often negligible for determining the ion mobility.

The ionisation of the sample to be analysed is first performed in an ion mobility spectrometer by supplying energy by means of an ionisation source. A large number of ionisation sources are known to a person skilled in the art, for example plasma sources. From the primary ions formed by means of the source, further product ions can be formed by complex molecular ion reactions and charge transfer processes with the sample substance. Due to the multi-stage character of ionisation, this takes place in the reaction chamber formed by the region between the ionisation source and the ion flow modulator.

Efficient ionisation at the ionisation source is a prerequisite for subsequent ionisations as well as for efficient measurement operation. Although the amount of primary ions produced generally increases with higher ionisation source energies, the amount of $NO_x$ compounds and formed ozone is also disadvantageous. In this context, ozone, nitrogen oxides and nitrogen oxide compounds ($NO_x$ compounds) are disadvantageous for use in the ion mobility spectrometer because they inhibit or prevent the ionisation of certain sample molecules. For example, $NO_x$ compounds bind negative charges due to their high electron affinity, which are therefore not available for further ionisation of the primary ions, and the increased formation of ozone leads to unwanted side reactions and higher wear of components located in the gas circuit, such as pumps and sensors. This thus limits the energy range that can be used for sample ionisation.

Therefore, constructive measures must be taken to ensure that the sample gas consisting of sample material and carrier gas effectively reaches the ionisation region near the ionisation source. However, it should be noted that if the inlet velocities of the sample gas are too low, only a small proportion of the sample might reach the ionisation source. At the same time, excessively high inlet velocities of the sample gas may lead to turbulence and complex flow paths. However, targeted supply of the sample material to the ionisation source is also disadvantageous, since certain product ions, such as dimers, require a larger formation zone in which primary monomer ions meet other neutral sample gas molecules. In addition, such "aiming" at the source is also prone to error due to tolerances.

As already described in the introduction, the ion mobility K in a materially well-defined drift medium can be determined by measuring the drift time and on the basis of equation (2). Furthermore, the temperature-dependent normalised ion mobility $K_0(T)$ can be determined from the ion mobility K determined in this way. However, it is disadvantageous that this requires the measurement of a large number of values, such as pressure, temperature, drift voltage and drift time, and the measurement errors of the individual measurements may add up. It is therefore advantageous to use a reference-based method for determining the ion mobility instead.

In this case, a reference substance is used, for which a normalised, temperature-dependent ion mobility $K_0^R(T)$ is known. If the physical-chemical conditions in the drift chamber are the same for the reference and sample measurements, the ion mobility of the sample substance $K_0^P(T)$ with the drift time $t_P$ can be calculated from the drift ratio $t_R/t_P$ by comparing the drift times of the reference substance and the sample substance by $K_0^P(T)=t_R/t_P*K_0^R(T)$. Advantageously, only the measurement error of the drift time measurement (which is in the range of the noise if the measurement sampling is sufficiently high) and the measurement error of the drift chamber temperature T (which only becomes significant if the ion mobility is strongly dependent on T) are relevant in this method. The reference substance is usually supplied externally, either via the sample supply line or via an additional gas inlet, which can be switched on via a valve. Disadvantageously, this requires a more complex design of the ion mobility spectrometer.

The object of the present invention is to overcome or minimise the disadvantages of the prior art and to provide an improved ion mobility spectrometer and an improved method for operating an ion mobility spectrometer.

DESCRIPTION OF THE INVENTION

A first aspect of the present disclosure relates to an ion mobility spectrometer (IMS) for determining ion mobility, preferably an ion mobility spectrum, of a sample, in particular a sample present in a sample gas (consisting of sample and a carrier gas). The ion mobility spectrometer according to the present disclosure in this case has a cylindrical drift chamber designed for transporting ions from a switching grid, preferably consisting of at least one grid electrode, to an ion detector. The drift chamber here is further designed in such a way that the ion flow therein is against an axial drift gas flow. The drift gas flow thus runs from the direction of the ion detector in the direction of the switching grid. A drift velocity is dependent here both on the effect of an electric field between the switching grid and the ion detector and on the interaction of the ions with the drift gas flow. Preferably, for a given electric field and a given drift gas flow, a constant drift velocity establishes itself for a given ion type, so that no macroscopic acceleration of the ions in the drift chamber occurs. In the context of the present disclosure, the axial direction refers to the height of the cylindrical drift chamber.

The ion mobility spectrometer of the present disclosure also has a cylindrical reaction chamber adjacent to the drift chamber in the axial direction. The axial direction refers here to the height of the cylindrical reaction chamber and is preferably identical to the axial direction of the cylindrical drift chamber. According to the invention, the reaction chamber has a sample gas inlet adjacent to the switching grid for introducing the sample gas. The sample gas inlet is designed here in such a way that the sample gas mixes with the drift gas, as explained in detail below. The sample gas inlet is located here on a side facing away from the drift chamber, adjacently to the switching grid. At the opposite end of the reaction chamber there is a gas outlet for discharging drift gas and sample gas, i.e. the mixture of these gases. Furthermore, a local ionisation source is arranged at the gas outlet of the ion mobility spectrometer according to the invention. Preferably, the range in which ionisation of the sample around the local ionisation source takes place is less than 5 mm, and thus the majority of the primary ions generated are generated in the immediate vicinity of the source.

According to the invention, the sample gas inlet has gas inlets arranged oppositely on an inner circumference of the reaction chamber. Such a sample gas inlet allows the sample gas flow and the drift gas flow to be combined in an advantageous manner and to be directed together in a unidirectional flow arrangement to the gas outlet, with an optimal flow occurring around the local ionisation source. Preferably, the sample gas inlet has gas inlets arranged in pairs opposite each other on an inner circumference of the reaction chamber. In principle, however, it is also conceivable that two oppositely arranged gas inlets are assigned to one gas inlet on one side. In the preferred paired arrangement, the sample gas inlet has at least one pair of oppositely arranged gas inlets, but preferably a plurality of such pairs. It is not the number of oppositely arranged gas inlets that is important, but the flow pattern achieved with the specific arrangement of the gas inlets, which is explained below.

With regard to the merging of the gas flows in an ion mobility spectrometer with a drift chamber and an adjacent reaction chamber, a distinction is usually made between the variants of gas guidance with bidirectional or unidirectional gas flow. With bidirectional flow, the drift gas flow and the sample gas flow point in opposite directions and are discharged via a common outlet in a transition region. If this is close to the drift chamber, some of the neutral sample gas flow and the moisture in it may disadvantageously enter the drift chamber. The sample gas flow and the ion flow point in the same direction. If plasma sources are used for ionisation, $NO_X$ compounds formed can enter the reaction chamber as a result of directed and undirected movements, where they inhibit the formation of negative product ions of the sample to be analysed due to their high electron affinity.

In the case of unidirectional flow guidance, the drift gas flow and the sample gas flow in the reaction chamber combine to form a resulting flow that is directed in the opposite direction to the ion flow. Without an electric field, the ions generated in the reaction chamber would thus also reach the gas outlet directly.

With a unidirectional flow around a local ionisation source, the advantage is that the neutral $NO_X$ compounds formed by ozone and radicals such as nitrogen monoxide reach the gas outlet directly and therefore cannot be ionised further. However, it is problematic that $NO_X$ compounds usually have a higher ion mobility than the product ions to be analysed, which would preferentially be flushed to the outlet if the flow velocity is too high and the field strength too low. The optimal flow around the local ionisation source is therefore of decisive importance in generating a maximum product ion signal, also because many substances also have a lower electron affinity than $NO_X$ compounds and would consequently not be detectable in low concentrations. Advantageously, the sample gas inlet according to the invention makes it possible to detect also ions that have very low ion mobility. Therefore, with the ion mobility spectrometer according to the invention, a minimum gas flow can be advantageously set in such a way that the formation of $NO_X$ compounds and their ionisation in the reaction chamber are suppressed.

In a preferred embodiment of the ion mobility spectrometer according to the invention, the drift chamber and the reaction chamber have a circular-cylindrical shape. In other words, the drift chamber and the reaction chamber have a circular cross-sectional area, with a radial direction of these circular areas being perpendicular to the axial direction of the particular chamber. Particularly preferably, the circular cross-sectional areas of the drift chamber and the reaction chamber are concentric with each other, the axial directions thus coinciding. Also preferably, the gas outlet of the reaction chamber is arranged concentrically with the reaction chamber and the drift chamber with respect to the axial direction. According to this preferred embodiment, the sample gas is supplied through the gas inlets advantageously with radial flow components. This enables a particularly efficient combination of sample gas flow and drift gas flow into a unidirectional gas flow along the axial direction as well as an optimal flow around the local ionisation source.

In a particularly preferred embodiment, the sample gas inlet, in particular the gas inlets which are preferably arranged opposite in pairs, is designed in such a way that radial components of the flow velocities of partial flows of the sample gas conducted through gas inlets which are arranged oppositely, preferably in pairs, compensate for one another. Preferably, the gas inlets are thus arranged and designed in such a way that a compensation of the radial inflow of carrier gas (with or without sample) takes place in such a way that no gas flow reaches the opposite outer wall of the reaction chamber. This is particularly preferably achieved by means of oppositely arranged pairs of flows from oppositely arranged pairs of gas inlets. It is essential, however, that the resulting radial velocity component of the introduced sample gas flow or the total radial flow of this gas flow is brought to zero. It is thus essential to the invention that the gas inlets are arranged at the edge in such a way that the sum of the partial flows prevents the radial flow to the outer wall of the reaction chamber. In principle, an inflow on one side could also be compensated by two or more inflows on the opposite side. However, a paired, symmetrical arrangement (point-symmetrical to the axial direction) of the gas inlets is preferred.

When calculating the ion mobility, it is usually assumed that the drift gas always has the same physical-chemical properties, so that the impact cross-section of the ion under investigation remains the same. However, if air in particular is used as the drift gas, the proportion of water it contains significantly changes the value of the ion mobility for some (especially negatively charged) ions due to the ion-dipole interaction, which impairs the distinguishability of many molecular ions.

The influence of the ion-dipole interaction decreases with increasing temperature, but the generation of high temperatures and heat insulation in mobile IMS devices is difficult to provide economically. The disadvantageous influence of humidity on ion mobility can be greatly reduced by using defined, dry air with an absolute water concentration of less than 100 ppm. In principle, this dryness requirement in the drift chamber can be maintained for a long time in sealed IMS devices with suitable filters.

To keep the drift chamber as contamination-free and dry as possible, a continuous drift gas flow (used herein synonymously with drift gas flow) is passed through said chamber. A gas flow is the gas flow density integrated over a cross-sectional area (flow cross-section). The gas flow density, in turn, is the product of gas concentration and gas velocity. The gas flow in the drift chamber is superimposed on the ion flow and can influence the effective drift time. To keep this influence low or negligible, the drift gas velocity has a comparatively smaller value (e.g. 4 cm/s) compared to the drift velocity of the ions (e.g. 4 m/s).

The sample is supplied into the reaction chamber via one or more inlets, as described. Via the sample gas flow (used synonymously herein with sample gas flow), not only the sample to be detected, guided by the carrier gas flow (used synonymously herein with carrier gas flow), enters the reaction chamber, but also amounts of water. If these enter the drift chamber, this in turn causes an undefined influence on the drift properties. With the sample gas inlet according to the invention, in particular a radial flow distributor, the sample gas flow is advantageously divided in such a way that at least two partial flows in the radial outlet direction compensate for one another with regard to the radial velocity components on the centre axis (axial direction) in the reaction chamber and mix with the dry drift gas flow and escape further in the direction of the reaction chamber. An essential advantage of the arrangement according to the invention is that, due to the radial mutual flow compensation and the superposition with the sufficiently large drift gas flow running perpendicular thereto, no parts of the sample gas flow enter the drift chamber. Therefore, the required dryness in the drift chamber is advantageously maintained permanently.

In a further preferred embodiment of the ion mobility spectrometer according to the invention, the sample gas inlet has an inflow ring running circumferentially around the reaction chamber. Frequently, the drift chamber and reaction chamber of an ion mobility spectrometer are not monolithically formed, but consist of a plurality of interconnected ring structures, for example to enable the integration of a plurality of drift electrodes in the drift chamber. In such an embodiment, the inflow ring is preferably shaped correspondingly to the other rings of the reaction chamber to enable easy integration of the inflow ring into the ion mobility spectrometer. The inflow ring preferably has at least one flow channel that connects a sample gas supply line and at least one gas inlet. The flow channel is preferably formed here as an internal cavity of the inflow ring. Also preferably, the flow channel is formed as an indentation on an axially oriented surface of the inflow ring, so that a closed and sealed flow channel is obtained by joining the inflow ring to an adjacent ring of the reaction chamber. The sample gas supply line refers here to an inflow opening for the introduction of the sample gas flow (or carrier gas flow without sample) from an external sample gas supply.

According to the invention, such an inflow ring solves the problem of avoiding contamination of the drift chamber by the sample gas and can be advantageously integrated into an ion mobility spectrometer. Preferably, the inflow ring is made of inert material, such as stainless steel or ceramic, in order to ensure long-term resistance to partially aggressive sample substances. The inflow ring is preferably designed as an insulator. Alternatively, the inflow ring is preferably realised as a voltage-conducting field support ring. Advantageously, when such an inflow ring is used, there are no flow obstacles in the reaction chamber where sample gas may disadvantageously accumulate, thus prolonging the flushing of the ion mobility spectrometer after a detection.

In a particularly preferred embodiment of the ion mobility spectrometer according to the invention, the sample gas inlet comprises gas inlets arranged oppositely in pairs on the inner circumference of the reaction chamber. Further preferably, each pair of oppositely arranged gas inlets comprises a first gas inlet and a second gas inlet. According to this embodiment, the sample gas supply line is connected to at least one first gas inlet via a first flow channel and to at least one second gas inlet via a second flow channel. In other words, the flow channel is split to supply the first gas inlets separately from the second gas inlets. This advantageously enables a particularly homogeneous flow guidance and a particularly good compensation of the radially opposing gas flows.

According to the invention, each first gas inlet can be assigned a corresponding first flow channel and each second gas inlet can be assigned a corresponding second flow channel. This means that each gas inlet is supplied via its own flow channel. Also preferably, a plurality of first gas inlets are jointly connected to the sample gas inlet via a first flow channel and a plurality of second gas inlets are jointly connected to the sample gas inlet via a second flow channel. Also preferably, all flow channels are connected to a single gas supply line. However, it is also possible that a plurality of gas supply lines are provided, for example one gas supply line per flow channel or per group of (first and second) flow channels.

Also preferably, all first gas inlets are connected to the sample gas inlet jointly via a first flow channel and all second gas inlets are connected to the sample gas inlet jointly via a second flow channel. Particularly preferably, the sample gas inlet is split into two channels in a fork-shaped symmetrical manner: into a first and a second flow channel, each along approximately half the circumference of the ring. Therefore, the original volume flow of the sample gas splits into two volume flows of half the size. In a simplest case, the inflow ring receives two symmetrically oppositely arranged circular or slotted gas inlets pointing in a radial direction towards the centre axis of the reaction chamber. Particularly in the case of a large volume flow of the sample gas or carrier gas and/or due to possible manufacturing tolerances, small opening cross-sections of the gas inlets may cause the partial flows to miss each other, which makes flow compensation more difficult. Preferably, the inflow ring therefore has multiple gas inlets in the first and second flow channel, which gas inlets are point-symmetrically opposite each other in relation to the axial direction.

In a further preferred embodiment of the ion mobility spectrometer according to the invention, flow obstacles are arranged in at least one flow channel for diverting a sample gas flow through the gas inlets. The flow obstacles are preferably designed in such a way that they enable the sample gas flow to flow in as a laminar flow to the greatest possible extent and/or cause the sample gas flow in the particular flow channel to be divided uniformly among the gas inlets leading from this flow channel. Particularly preferably, comb-shaped flow resistors are introduced along each flow channel downstream of each gas inlet, so that the flow is distributed over a plurality of gas inlets guided by the teeth (partial resistors) of the comb and the flow thus exits over a larger cross-section. Furthermore, due to the shape (height and width), number and distribution of the teeth along the channel, a uniform radial exit of the velocity-reduced partial flows is achieved, which reliably meet in the centre of the reaction chamber and compensate for one another in respect of radial velocity.

Particularly preferably, at least one flow channel of the inflow ring has a plurality of gas inlets, as described above. According to this embodiment, a flow obstacle for diverting a sample gas flow is preferably arranged between each two gas inlets. If the flow channel is, for example, a circumferentially running indentation in the inflow ring, the gas inlets are preferably formed by indentations which radially extend from the flow channel and break through an inner wall of the inflow ring. The flow obstacles are preferably formed here from the material of the inflow ring remaining between the radially formed indentations. Particularly preferably, the circumferential indentation in the region of the radial indentations and flow obstacles has a smaller width than in the region of the sample gas inlet without branching gas inlets. Particularly preferably, the flow obstacles are designed to level the partial flows of the sample gas exiting through gas inlets in terms of volume flow and/or velocity.

In a likewise preferred embodiment of the ion mobility spectrometer according to the present invention, the gas outlet of the reaction chamber has a smaller flow cross-section than the reaction chamber and/or the drift chamber. Particularly preferably, the flow cross-section of the reaction chamber is smaller than the flow cross-section of the drift chamber and the flow cross-section of the gas outlet is smaller than the flow cross-section of the reaction chamber. The increasing tapering of the flow cross-sections in this case advantageously causes an increase in the combined gas flows at the local ionisation source. The gas outlet particularly preferably has an aperture or a capillary tube with a diameter of 2 mm to 10 mm. According to this embodiment, it is advantageously ensured that a flow velocity of a total gas flow formed of sample gas flow and drift gas flow is at least 50 cm/s in a region of 2 mm around the local ionisation source. The drift medium is preferably air with a water concentration of less than 100 ppm and the flow velocity of the drift medium is preferably from 2 cm/s to 10 cm/s. The flow velocities are further achieved by the operating parameters, for example volume flow or mass flow, pump speed, pump power or valve opening, of a drift gas supply and/or a sample gas supply. The low water concentration is preferably ensured by the use of molecular sieve and/or suitable (membrane) filters.

In a likewise preferred embodiment of the ion mobility spectrometer according to the invention, the local ionisation source is configured for a dielectric barrier discharge. In other words, the local ionisation source is a dielectric barrier discharge source, with all electrodes protected by a plasma-resistant dielectric. The dielectric barrier discharge ionisation source is suitable and configured for generating a low-temperature plasma. The use of low-temperature plasma for ion generation in ion mobility spectrometers is known in principle from the prior art. Various embodiments for such methods are known. The average temperature of a low-temperature plasma corresponds approximately to the ambient temperature. The plasma, which on average has a neutral charge, consists of a mixture of negative charge carriers such as electrons and ions, positively charged ions and neutral particles. A prerequisite for the formation of such a plasma is high reduced electric field strengths, which are achieved by applying a high voltage to the electrodes. Due to the dependence on the reduced electric field strength, the ignition process is both pressure- and temperature-dependent. According to Paschen's law, a minimum ignition voltage is necessary for the plasma to form, which can be different for direct and alternating voltage. Since complex kinetic processes take place during plasma formation, the ignition voltage is also explicitly dependent on the temperature. After successful ignition of the plasma, it can usually be maintained with lower voltages.

To protect the electrodes of a dielectric barrier discharge source from corrosion, they are partially or completely separated from the plasma by a dielectric. Since no charge transfer takes place through this insulation, the plasma can only be generated by means of alternating voltage. To avoid energy losses due to the collisions of the charges at the insulator, alternating voltages with high frequencies are used, especially with frequencies higher than 40 kHz. Due to the mass inertia of the ions and the electrons, fewer collisions occur on the wall of the dielectric or the ion mobility spectrometer at such a voltage. Such a source is preferably realised by a gas-tight glass body filled with the noble gases helium, krypton or argon, to which a high-frequency high-voltage field is applied to generate vacuum UV radiation. The vacuum UV radiation exits the glass body through a thin window that is transparent to the spectral range and causes photoionisation of the sample gas, with the electrodes being insulated by the glass and located outside the plasma. Electrodes that are fully protected by a plasma-resistant insulator, such as corona-resistant polyimide or a glass coating, are likewise preferably used. Particularly preferably used are wire electrodes of which the wires are formed of, for example, tungsten and are insulated with thin glass. Such a wire electrode is described, for example, in Coy et al. 2016. A Gapless Micro-Dielectric-Barrier-Discharge Ion Source for Analytical Applications. ArXiv e-prints, 2016. 1602. http://arxiv.org/abs/1602.06242, the content of which is hereby fully referenced. When high-frequency high voltage is applied to such an electrode, plasma forms at the wire contact points. Coy et al. have already observed the formation of $NO_X$ compounds on such wire electrodes. Although a net-like arrangement of such electrodes, in which wires touch each other in pairs similarly to single contact, is particularly advantageous for use in an ion mobility spectrometer, the amount of undesired by-products increases.

When using such a plasma source, the plasma under atmospheric conditions, at which the ion mobility spectrometer according to the invention is to be operated, is generated in a zone of a few millimetres between the electrodes. Therefore, such electrode arrangements are local ionisation sources and, more specifically, local plasma sources. During the formation of the plasma, its composition is determined by chemical reactions of the ions and neutral gas particles, starting from the molecules that are significantly present in air (molecular oxygen and nitrogen), with ozone and oxygen compounds of nitrogen also being produced as by-product ions. Depending on their charge, the ions formed locally under atmospheric pressure are drawn out of the immediate vicinity of the plasma formation zone by an electric field superimposed on the discharge field.

In the ion mobility spectrometer according to the invention, the sample gas stream, which is mixed with the drift gas stream and dried, is led to the local ionisation source in the reaction chamber. The ionisation and formation of primary ions as well as undesired by-products such as $NO_X$ and ozone take place in the immediate vicinity of the source. The inventors have surprisingly found through experiments and comparative computer simulations that with a flow velocity of the total gas flow of more than 50 cm/s in the immediate vicinity of the ionisation source of about 2 mm diameter, the formation of these unwanted by-products can be suppressed. In conventional ion mobility spectrometers, the gas volume flows in the reaction chamber do not reach such a high velocity. In the ion mobility spectrometer according to the invention, such a velocity can be achieved by narrowing (tapering) the flow channel.

Preferably, the reaction chamber is funnel-shaped with a flow cross-section near the source (significantly) smaller than the flow cross-section near the switching grid. However, this requires the use of different segment elements in a reaction chamber constructed from field support rings and insulators, which increases the cost and complexity of manufacture. Preferably, a sufficiently high flow velocity is therefore achieved by placing a narrow flow channel as a capillary tube or as an aperture with a small inner diameter of, for example, 4 mm in the immediate vicinity of the local ionisation source, for example at a distance of 2 mm. Such an aperture is preferably placed downstream of the source to avoid deposits.

Particularly preferably, the local ionisation source in the ion mobility spectrometer according to the invention is placed in the gas outlet, and the gas outlet has a flow cross-section of 6 mm or less. The arrangement in the gas outlet in this case preferably also denotes an arrangement of the ionisation source in the reaction chamber near the gas outlet. The flow velocity of the gas flow increases according to the ratio of the flow cross-section of the reaction chamber to the flow cross-section in the gas outlet. Advantageously, in the ion mobility spectrometer according to the invention, undesired reaction products of the ionisation source are thus discharged directly through the gas outlet, and a backflow or diffusion into the reaction chamber is also prevented. If the local ionisation source according to Coy et al. is constructed with crossing glass-insulated wires and is arranged near or in the gas outlet, the smaller diameter of the gas outlet advantageously causes mechanical vibration stabilisation of the ionisation source.

In a likewise preferred embodiment, the ion mobility spectrometer according to the present disclosure further comprises at least one potential source arranged in the reaction chamber for generating an electric field for transporting ions formed at the local ion source away in the direction of the drift chamber. This potential source advantageously enables primary ions formed at the ionisation source to be transported away from the latter and thus prevents a recombination of the ions at the source. Also preferably, the mean electrical potential of the local ionisation source is coupled to the potential of the surrounding reaction chamber in order to optimise the formation rate of the product ions. Particularly preferably, a field support ring located in the reaction chamber in the immediate vicinity of the ionisation source is used as potential source. By means of the potential source and the field of the ionisation source as reference potential, an axial field is created for the transport of the primary ions into the reaction chamber. In addition, by means of the potential source, which preferably serves as a field support ring, a radial field component in relation to the ionisation source can also be achieved in the reaction chamber and thus a widening of the primary ion beam, which is initially small in diameter. Preferably, the potential source, for example the nearest field support ring, is therefore at an increased potential compared to the mean potential of the local ionisation source and surrounds the local ionisation source centrically at a short distance. Therefore, the neutral sample molecules flowing past the local ionisation source at a greater radial distance are also advantageously ionised. Advantageously, this is followed by a zone with drift velocity reduction, which is created by a small or disappearing potential difference to the next neighbouring field support ring in the direction of the drift chamber. This increases the residence time of the primary ions in the reaction chamber and consequently also the probability of the formation of product ions from the primary ions.

The effective removal of the primary ions by means of the electric potential source also advantageously counteracts the undesired formation of ions from the $NO_X$ compounds. When adjusting the field strength generated by the potential source, it must be taken into account that if the field strength is too low, ions will be flushed to the gas outlet and/or a recombination of ions will occur at the local ionisation source. Therefore, a sufficient field strength is required to enable the transport of ions into the reaction chamber in conjunction with the high gas flow to suppress the formation of neutral $NO_X$ compounds at the plasma source and their penetration into the reaction chamber. Through the interaction of a high flow velocity at the local ionisation source (>50 cm/s) and a sufficiently high field strength in the direction of the reaction chamber, an increase in the primary ion flow can be advantageously achieved.

Further preferably, the ion mobility spectrometer according to the present disclosure has a drift gas inlet arranged in the region of the ion detector. In a cylindrical drift chamber, the ion detector is preferably arranged on the top surface of the drift chamber facing away from the reaction chamber. At least one drift gas inlet is preferably arranged adjacently to the detector, for example concentrically around a circular detector. Preferably, the drift gas inlet is formed as a ring opening arranged concentrically around the detector, which advantageously allows a laminar formation of the drift flow. Also preferably, the ion mobility spectrometer according to the present disclosure comprises a drift gas supply for the controllable supply of drift gas and a sample gas supply for the controllable supply of sample gas. The supplies are preferably arranged outside the reaction chamber and the drift chamber, wherein the sample gas supply feeds sample gas to the sample gas inlet (carrier gas with or without sample material) via the sample gas supply line, and wherein the drift gas supply feeds the drift gas inlet with drift gas. For this purpose, each of the supplies can have one or more pumps and/or one or more valves and can have gas supply lines designed, for example, as hoses or piping. The design of gas supply lines is known to a person skilled in the art and is not the subject of this application.

Another aspect of the present disclosure relates to a method for operating an ion mobility spectrometer for determining an ion mobility spectrum of a sample, in particular a method for operating an ion mobility spectrometer according to the present disclosure as described above. In this respect, the method according to the invention comprises the method steps described below. In a first method step of the method according to the invention, first operating parameters are set. The first operating parameters relate to the operation of a local ionisation source, a drift gas supply for supplying air as drift gas and/or a sample gas supply of the ion mobility spectrometer for generating $NO_X$ ions at the local ionisation source and for introducing the generated $NO_X$ ions into a drift chamber of the ion mobility spectrometer. The first operating parameters are selected here in such a way that the formation of $NO_X$ compounds at the local ionisation source and their entry into the drift chamber are effected in such a way that the concentration of the $NO_X$ compounds in the drift chamber makes it possible to determine the determination of unique $NO_X$ peaks in an IMS spectrum. In a further step of the method according to the invention, a first drift time $t_{NOX}$ of the $NO_X$ ions through the drift chamber of the ion mobility spectrometer is measured. The drift time measurement is carried out while maintaining the first operating parameters and the current drift chamber conditions, for example at a current drift chamber temperature T.

In a further step of the operating method according to the invention, second operating parameters of the local ionisation source, of the drift gas supply and/or of the sample gas supply are set, wherein the second operating parameters relate to or bring about the generation of sample ions without the formation of $NO_X$ ions at the local ionisation source and/or the avoidance of the introduction of $NO_X$ ions into the drift chamber. In other words, the second operating parameters are selected in such a way that such a low concentration of $NO_X$ compounds occurs in the drift chamber of the ion mobility spectrometer that no $NO_X$ peaks are present in an IMS spectrum. In a further step of the method according to the invention, a second drift time $t_P$ of the sample ions is measured through the drift chamber of the ion mobility spectrometer. The drift time measurement is carried out while maintaining the second operating parameters and the current drift chamber conditions, such as the current drift chamber temperature T.

In the method according to the invention, a normalised ion mobility of the sample $K_0^P(T)$ is also determined on the basis of the measured first drift time $t_{NOX}$, the measured second drift time $t_P$ and a normalised ion mobility of the $NO_X$ ions $K_0^R(T)$ as a reference according to $K_0^P(T)=t_{NOX}/t_P*K_0^R(T)$. The normalised ion mobility of the $NO_X$ ions $K_0^R(T)$ is preferably taken from a reference table which contains the known values of the normalised ion mobility of the $NO_X$ ions which have preferably been determined for the ion mobility spectrometer used in the method in a test stand, in particular for a plurality of drift chamber temperatures. Particularly preferably, $K_0^R(T)$ can be calculated from a mathematical interpolation function of which the interpolation parameter results from the measured values determined in the test stand. The normalised ion mobility of $NO_X$ ions is frequently used as a reference value in ion mobility spectroscopy and corresponding values are therefore available. However, the method according to the invention enables an internal generation of $NO_X$ ions as a reference (calibrant) in a first operating mode of an ion mobility spectrometer and enables a reference-based measurement of an IMS spectrum of a sample in a second operating mode of the ion mobility spectrometer.

In a preferred embodiment of the method according to the invention, the first operating parameters stop or reduce the sample supply. If necessary, carrier gas without sample material contained therein is also introduced in order to realise largely similar flow conditions in all operating modes. Also preferably, the first operating parameters adjust a flow rate of the sample gas supply and/or the drift gas supply in such a way that a flow velocity at the local ionisation source is set to preferably less than 50 cm/s. The flow velocity refers here to a total gas flow at the source.

Also preferably, the first operating parameters set a supply voltage of a dielectric barrier discharge source as a local ionisation source above a predetermined limit voltage. The limit voltage is preferably determined here empirically for the ion mobility spectrometer used in the method according to the invention, and preferably depending on the ambient conditions of pressure and temperature at the discharge source, and relates to a voltage above which the concentration of NOX ions is above a predetermined limit value and below which this concentration is below this limit value.

Also preferably, the second operating parameters set a flow rate of the sample gas supply and a flow rate of the drift gas supply such that a flow velocity of the total flow at the local ionisation source is preferably above 50 cm/s. Also preferably, the second operating parameters set the supply voltage of the dielectric barrier discharge source below the predetermined limit voltage. In addition to the aforementioned first and second operating parameters, further operating parameters can be determined for the ion mobility spectrometer used in the method according to the invention which significantly influence the presence of $NO_X$ ions in the drift chamber.

For the detection of many substances in an ion mobility spectrometer, the $NO_X$ compounds generated in conjunction with the plasma are disadvantageous. With the measures described above, the formation of such compounds or their entry into the reaction chamber and the drift chamber can be suppressed in a targeted manner. On the other hand, the ions of the $NO_X$ compounds in dry, clean air have characteristic normalised ion mobilities $K_0^R(T)$, i.e. positions (peaks) in the drift time spectrum. In the first operating state of the ion mobility spectrometer, preferably without external sample supply, these positions can be used as internal references for calibration. Preferably, this first operating state is established for a short time, for example in a time less than 1 s. Also preferably, the first operating state is achieved by increasing the high-voltage amplitude and lowering the total gas flow around the local ionisation source, with only the spectral intensity necessary for reliable evaluation being generated.

Once the calibration is complete, it must be ensured that the $NO_X$ compounds leave the reaction chamber and the original measurement state is established. The method according to the invention therefore preferably further comprises the step of discharging the $NO_X$ ions from the reaction chamber. Also preferably, the method according to the invention comprises the step of reducing or switching off the high-voltage amplitude of the ionisation source to at least below the limit voltage in parallel with the step of ejecting the $NO_X$ ions. By switching off or lowering the high voltage below the voltage necessary to maintain the plasma and by means of a flushing with increased dry drift gas flow, the time to restore the original measurement state is shortened. If the intensity for the ions of the $NO_X$ compounds falls below a predetermined threshold value after ejection, the original measurement state is thus restored. For verification, the second measurement state with which a sample would be measured must be established briefly so that the drift time spectrum can be evaluated with regard to the formation of the $NO_X$ ions.

As already explained above, suppression of ion formation from $NO_X$ compounds is possible by using the lowest possible high-voltage amplitude for ignition and maintenance of the plasma. At the same time, the minimum ignition voltage of the plasma depends on the gas density and thus, according to the ideal gas law, on the temperature and the absolute pressure of the gas, however, these values can change during operation. According to the invention, the ignition and maintenance of the plasma is controlled depending on the temperature and pressure of the gas flowing past by means of a control system which sets the optimum high-voltage parameters for amplitude and frequency and adjusts them in the event of a change. In addition, this control system controls the gas flow. In order to ensure the ignition and maintenance of the plasma at minimum voltage, the gas temperature and gas pressure in the vicinity of the ionisation source are further preferably measured by sensors, and the drift time spectrum is measured. The integral over the entire drift time spectrum or over selected ranges is an additional control variable which is a measure of the ion production. By means of the aforementioned control systems, the first operating mode and second operating mode are also preferably realised.

The ion mobility spectrometer according to the invention is preferably operated with dry air (water content of less than 100 ppm) as drift gas and likewise dry carrier gas. Under these conditions, ignition of the plasma is particularly difficult. On the other hand, a higher water content usually promotes the ignition of the plasma. Therefore, a higher ignition voltage is usually required for igniting the plasma in dry air.

The ion mobility spectrometer according to the invention preferably has a radiation source which is designed and set up for irradiating the local ionisation source with light in a wavelength range from 480 to 280 nm. Surprisingly, it has been shown that by means of such an irradiation of the local ionisation source in dry air with a water content of less than 100 ppm, both the ignition voltage of the plasma can be lowered and the time for igniting the plasma can be shortened. Advantageously, in the wavelength range mentioned, an optical radiation power of less than 100 mW is sufficient to significantly support plasma ignition.

Particularly preferably, the radiation source is a light-emitting diode with wavelengths of 480 to 280 nm. This wavelength range corresponds to the second positive series of molecular nitrogen. Particularly preferably, the radiation source is designed to irradiate the local ionisation source with wavelengths at 405 nm. Particularly preferably, the radiation source is a laser diode with a corresponding wavelength, for example a laser diode as commonly used in Blu-ray players. The local plasma source is preferably illuminated by at least one radiation source directly, indirectly and/or in a focused manner via fibre optic cables. The irradiation is preferably performed for a short time until the onset of ionisation, which can be recognised in the drift time spectrum on the basis of the intensities, for example for the reactant ions. A minimum value of the intensity or the integral in a predetermined interval can be used as a criterion for switching off the radiation source, and falling below the minimum value causes the radiation source to be switched on again. Pulsed continuous operation of the radiation source is also preferred. The pulse width is preferably adapted to the ambient conditions, such as humidity, pressure and temperature of the plasma source.

The method steps of the method according to the invention can be implemented by electrical or electronic parts or components (hardware) by firmware (ASIC) or by executing a suitable program (software). Also preferably, the method according to the invention is realised or implemented by a combination of hardware, firmware and/or software. For example, individual components for carrying out individual method steps are designed as a separate integrated circuit or are arranged on a common integrated circuit. Individual components for carrying out individual method steps are also preferably arranged on a (flexible) printed circuit board (FPCB/PCB), a tape carrier package (TCP) or another substrate.

The individual method steps of the method according to the invention are further preferably designed as one or more processes which run on one or more processors in one or more electronic computing devices and are generated during the execution of one or more computer programs. The computing devices are preferably designed to cooperate with other components, for example a communication module and one or more sensors, in order to implement the functionalities described herein. The instructions of the computer programs are preferably stored here in a memory, such as a RAM element. However, the computer programs can also be stored in a non-volatile storage medium, such as a CD-ROM, a flash memory or the like.

It is further apparent to a person skilled in the art that the functionalities of several computers (data processing devices) can be combined or combined in a single device or that the functionality of a particular data processing device can be distributed to a plurality of devices in order to carry out the steps of the method according to the invention without deviating from the method described in accordance with the invention. The preferred embodiments of the method according to the invention correspond to the preferred embodiments of the ion mobility spectrometer according to the invention.

DESCRIPTION OF THE FIGURES

Exemplary embodiments of the present invention are explained below with reference to the accompanying drawings. The drawings show.

Figure 1:
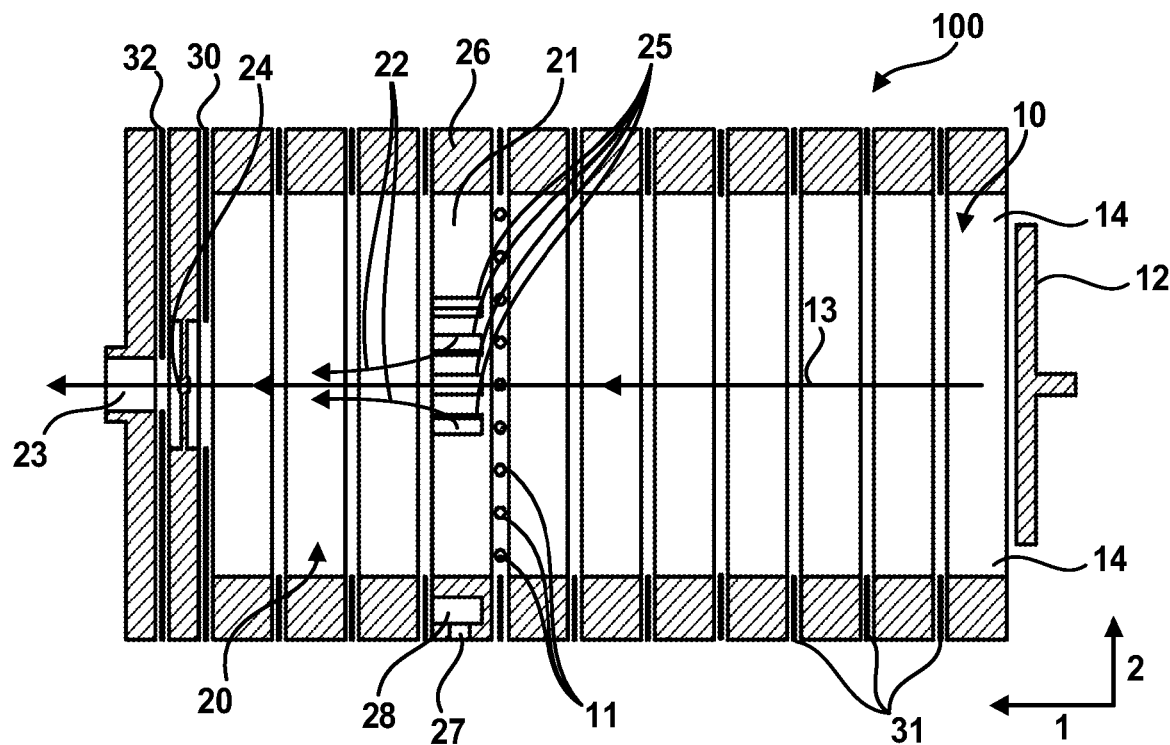
FIG. 1 is a schematic lateral sectional view of an ion mobility spectrometer according to an embodiment.
Figure 2:
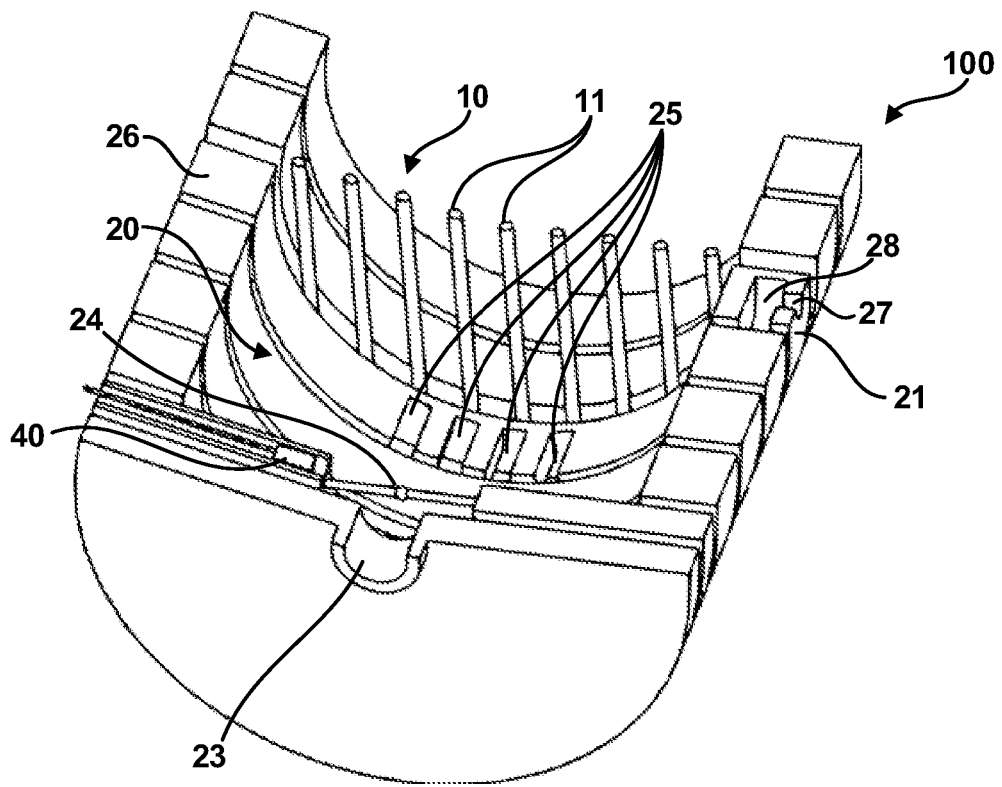
FIG. 2 is a schematic perspective sectional view of a reaction chamber and of parts of a drift chamber of an ion mobility spectrometer according to an embodiment.

An ion mobility spectrometer 100 according to one embodiment of the present disclosure is shown in FIG. 1 in a schematic side view and in FIG. 2 in a schematic, perspective sectional view. The ion mobility spectrometer 100 has a cylindrical drift chamber 10 and a cylindrical reaction chamber 20 adjacent thereto in the axial direction 1. The drift chamber 10 is delimited on one side facing the reaction chamber 20 by a switching grid 11. On a side opposite the switching grid 11, the drift chamber 10 is delimited by an ion detector 12 and the reaction chamber 20 is delimited by a gas outlet 23. A drift gas inlet 14 is arranged annularly around the ion detector 12. A sample gas inlet 21 is arranged in the reaction chamber 20 adjacent to the switching grid 11 and has gas inlets 25 arranged in pairs opposite each other on an inner circumference of the reaction chamber 20. A local ionisation source 24 configured for dielectric barrier discharge is further arranged in the reaction chamber 20 near the gas outlet 23.

Figure 5:
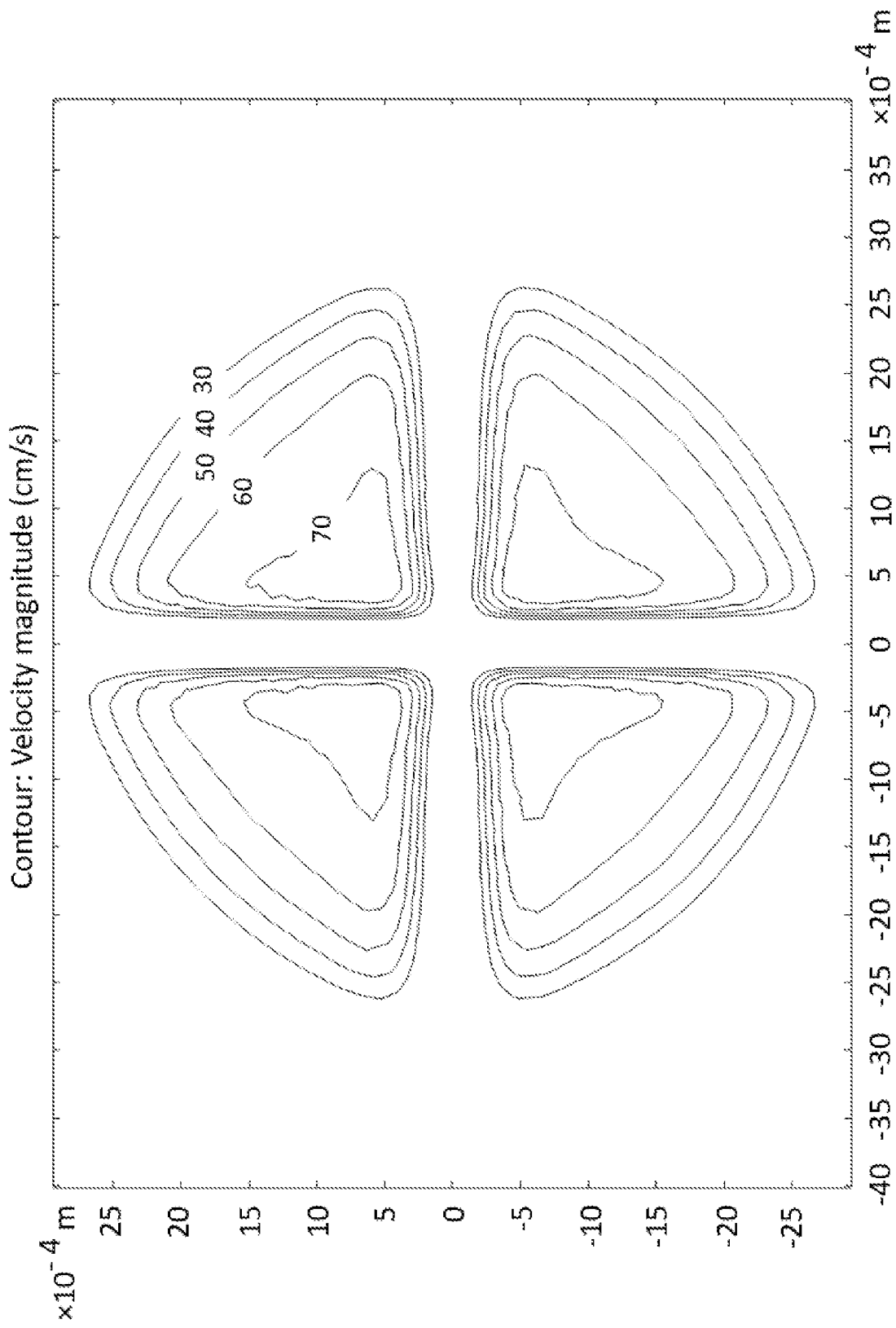
FIG. 5 is a schematic cross-sectional view of the flow velocity of the total flow around the local ionisation source at the gas outlet of an ion mobility spectrometer according to one embodiment.

During operation of the ion mobility spectrometer 100, a drift gas 13, in particular dry air with a water content of less than 100 ppm, is introduced into the drift chamber 10 by means of a drift gas supply (not shown) through the drift gas inlet 14 at a defined flow velocity, for example 4 cm/s. The drift gas 13 flows through the drift chamber 10, the switching grid 11 and the reaction chamber 20 and leaves the ion mobility spectrometer 100 through the gas outlet 23. Furthermore, during operation of the ion mobility spectrometer 100, a sample gas 22 consisting of sample material contained in a carrier gas can be introduced into the reaction chamber 20 through a sample gas inlet 21. The sample gas 22 mixes with the drift gas stream 13 in an axial direction downstream of the sample gas inlet 21, and the total gas flow formed of the sample gas stream 22 and the drift gas stream 22 flows towards the gas outlet 23, wherein the total gas flow is increased due to the smaller flow cross-section of the gas outlet 23. Before the increased total gas flow leaves the ion mobility spectrometer 100 through the gas outlet 23, it flows around a local ionisation source 24, reaching flow velocities of more than 50 cm/s depending on the flow rate of the drift gas 13. A flow profile in the cross-section of the ion mobility spectrometer 100 around the local ionisation source 24 is shown in FIG. 5. The contour lines indicate a flow velocity of the gas in cm/s. Accordingly, flow velocities of the total gas flow of about 70 cm/s are achieved in the region of the local ionisation source 24.

At the local ionisation source 24, the sample material is ionised by a dielectric barrier discharge. In addition, components of the air used as drift gas 13 may be ionised. In the vicinity of the local ionisation source 24, an LED is arranged as a radiation source 40, by means of which the local ionisation source 24 can be directly illuminated. When switched on, the LED 40 can be used to ensure ignition of the plasma under dry ambient conditions, in particular when both the drift gas and the carrier gas or sample gas are dry, for example with a water concentration of the total flow of less than 100 ppm.

The reaction chamber 20 also has a local potential source 30 by means of which an electrical voltage can be built up with respect to a reference source 32 (ground). Depending on the potential difference thus generated between ionisation source 24 and potential source 30, ions of a certain polarity are moved in the direction of the switching grid 11 and against the total gas flow. The movement is further mediated by further potential support rings (field support rings) 31, which are arranged both in the reaction chamber 20 and in the drift chamber 10. In this case, mainly ions with a ratio of ion velocity and flow velocity greater than one are moved against the total gas flow towards the switching grid 11, while others are guided by the high flow velocity of the total gas flow towards the gas outlet 23 and through it out of the ion mobility spectrometer 100. Ions reaching the switching grid 11 are moved in a defined manner against the drift gas flow 13 in the direction of the ion detector 12 in the drift chamber by the potential support rings 31 arranged therein. The ion mobility of the ions can be determined on the basis of the measured drift times which the ions require for the distance from the switching grid 11 to the ion detector 12. It has been shown that the design of the ion mobility spectrometer 100 according to the present disclosure advantageously allows separation of ionised sample material and neutral particles formed by the ionisation source. Therefore, the ion mobility spectrometer 100 of the present disclosure can be used to determine an ion mobility spectrum that is largely free of interfering peaks, for example of $NO_X$ ions.

Figure 3:
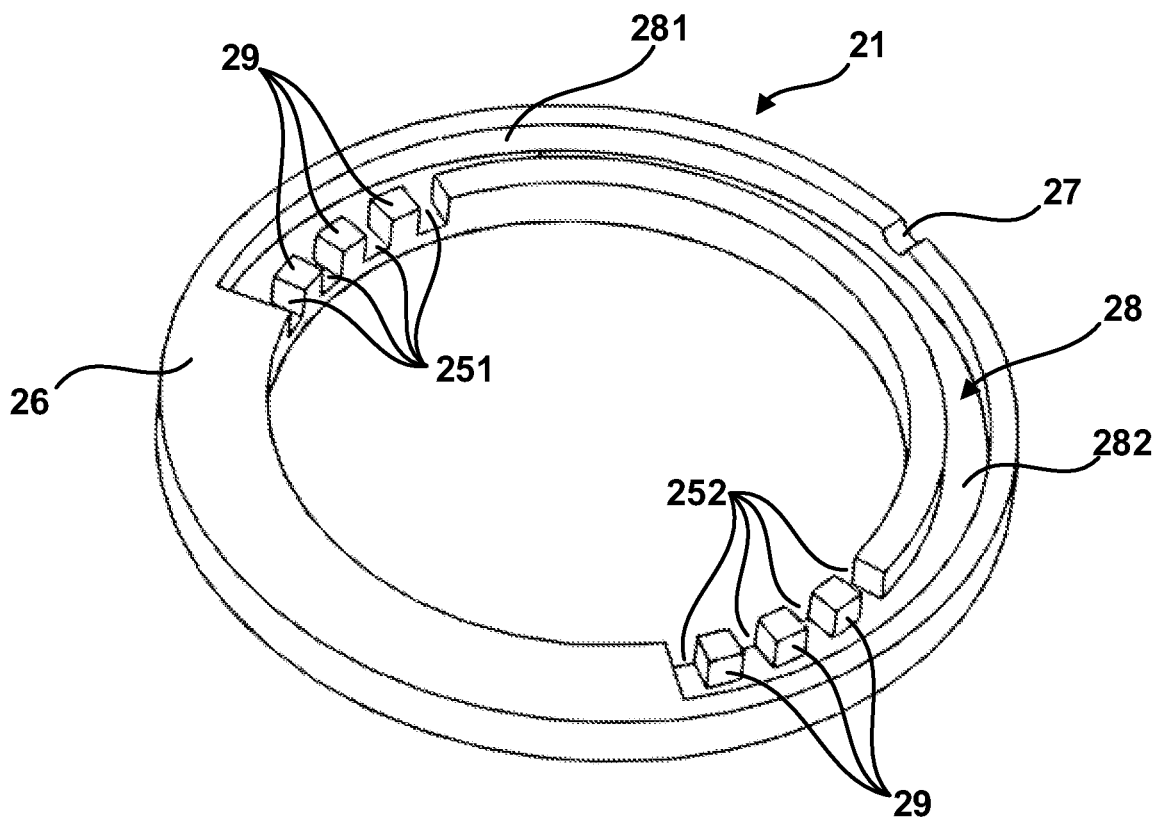
FIG. 3 is a schematic perspective view of an inflow ring according to an embodiment.

According to one embodiment, the sample gas inlet 26 has an inflow ring 21, as shown schematically in the perspective view of FIG. 3. The inlet ring 21 in this case has a sample gas supply line 27 which is designed for connection to an external sample gas supply (with pumps and/or valves, not shown). According to FIG. 3, the sample gas supply line 27 is formed as a bore through an outer circumference of the inflow ring 21. Furthermore, the inflow ring 21 has a flow channel 28 which, according to FIG. 3, is formed as an indentation made on an axial surface of the inflow ring 21 and connected to the sample gas supply line 27. The flow channel 28 is then sealed by installing the inflow ring 21 in the ion mobility spectrometer 100 using suitable adhesives, soldering or elastomer seals between the inflow ring 26 and adjacent annular segments of the ion mobility spectrometer 100.

The inflow ring shown in FIG. 3 has in particular a first flow channel 281 branching off in a first direction from the sample gas supply line 27 and a second flow channel 282 branching off in a second direction from the sample gas supply line 27. The first flow channel 281 connects the sample gas supply line 27 to a plurality of first gas inlets 251 for introducing the sample gas 22 with radial flow components, that is to say at least partially in radial direction 2 (see FIG. 1). The gas inlets 251 can be oriented here perpendicularly to the axial direction 1 and point directly to an axis of rotational symmetry of the ion mobility spectrometer 100. However, the gas inlets 251 may also include a slightly acute angle with the axial direction 1 so that the sample gas flow 22 is introduced with an axial velocity component in the direction of the ionisation source 24 as well as radial velocity components. The second flow channel 282 also connects the sample gas supply line 27 to a plurality of second gas inlets 252 for introducing the sample gas 22. The first gas inlets 251 and the second gas inlets 252 are arranged here oppositely in pairs. In particular, the first gas inlets 251 and the second gas inlets 252 are arranged point-symmetrically to each other with respect to the axis of rotational symmetry of the ion mobility spectrometer 100 pointing in the axial direction 1. Advantageously, this allows a radial velocity component of the sample gas flow 22 introduced through a first gas inlet 251 and a radial velocity component of the sample gas flow 22 introduced through an opposite second gas inlet 252 to compensate for one another. Advantageously, this causes the radial flow velocity of the sample gas stream 22 in the region of the axis of rotational symmetry to be almost zero, so that the sample gas stream 22 does not flow to the opposite wall of the reaction chamber 20. This results in an advantageous sample delivery to the local ionisation source 24, in particular to a limited spatial region around the local ionisation source 24. The ion mobility spectrometer 100 of the present disclosure thus enables a high yield of ions of the sample material generated at the local ionisation source 24.

Figure 4A:
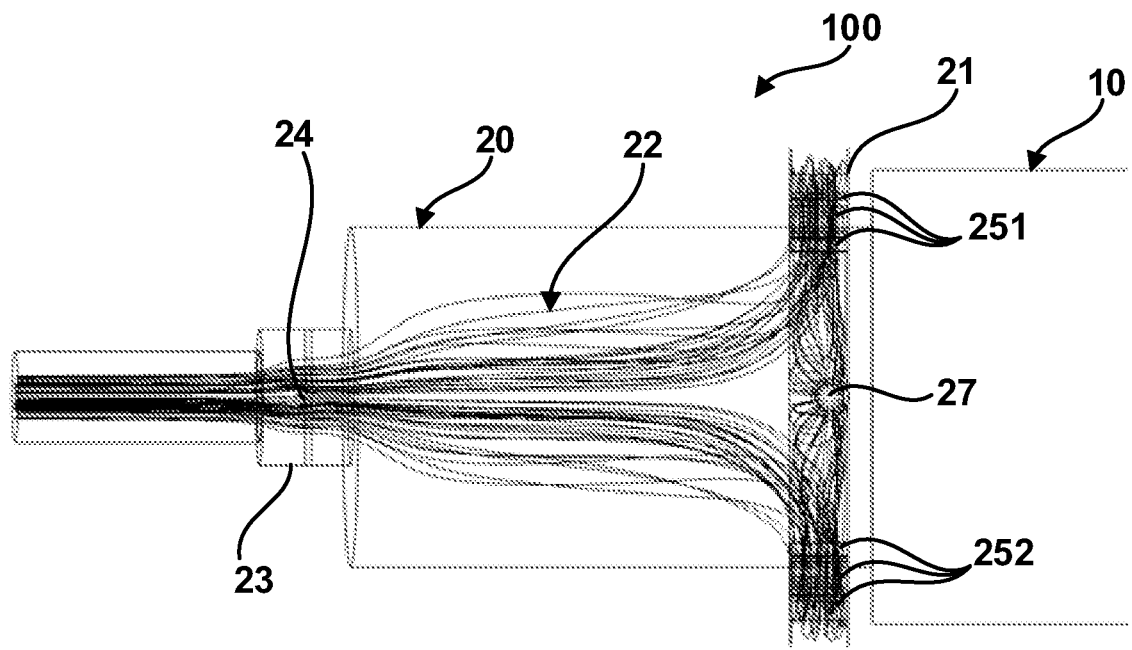
FIGS. 4(A)-4(C) are a schematic views of FIG. 4(A) being a sample gas flow, FIG. 4(B) being a drift gas flow, and FIG. 4(C) a total flow formed of sample gas flow and drift gas flow in an ion mobility spectrometer according to one embodiment.

FIGS. 4(A), (B) and (C) schematically show the sample gas flow 22, the drift gas flow 13 and the total gas flow 13, 22 in the ion mobility spectrometer 100. As shown in FIG. 4(A), the sample gas 22 is first introduced through the sample gas supply line 27 into the inflow ring 26, in particular into flow channels (not shown) arranged internally therein. Via the flow channels, the sample gas 22 reaches first gas inlets 251 and oppositely arranged second gas inlets 252 and is introduced through these into the reaction chamber 20. By being introduced via oppositely arranged inlets 251, 252, the radial flow components of the sample gas 22 effectively compensate for one another. By superposition with the drift gas flow, not shown in FIG. 4(A), the sample gas 22 is also displaced towards the local ionisation source 24 and increased and discharged downstream through the gas outlet 23.

Figure 4B:
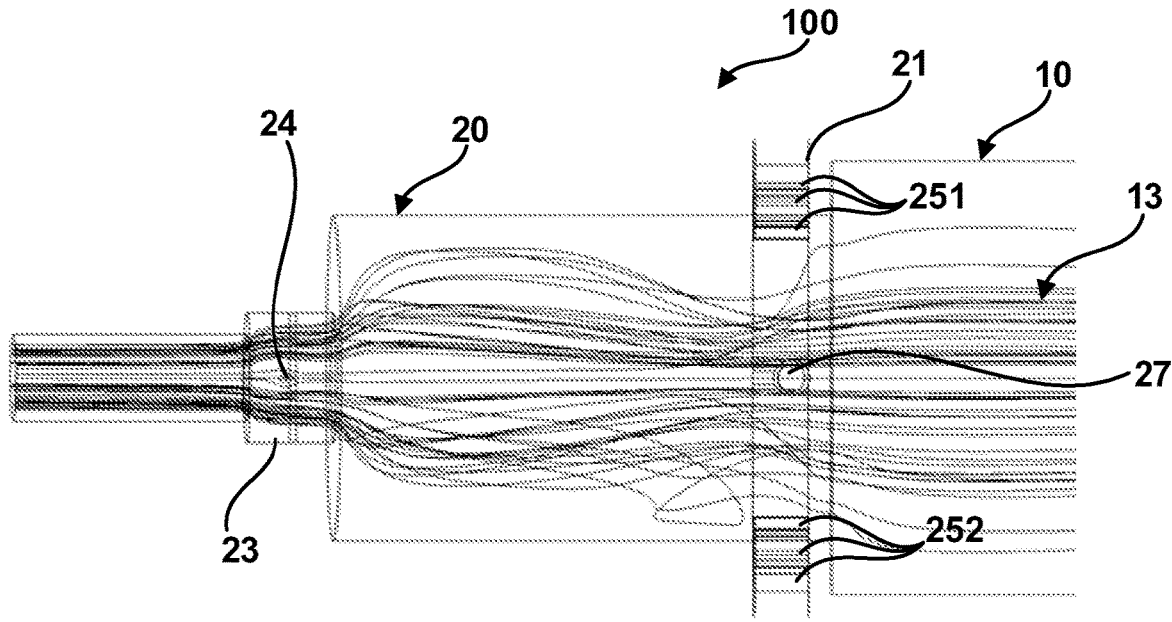
Figure 4C:
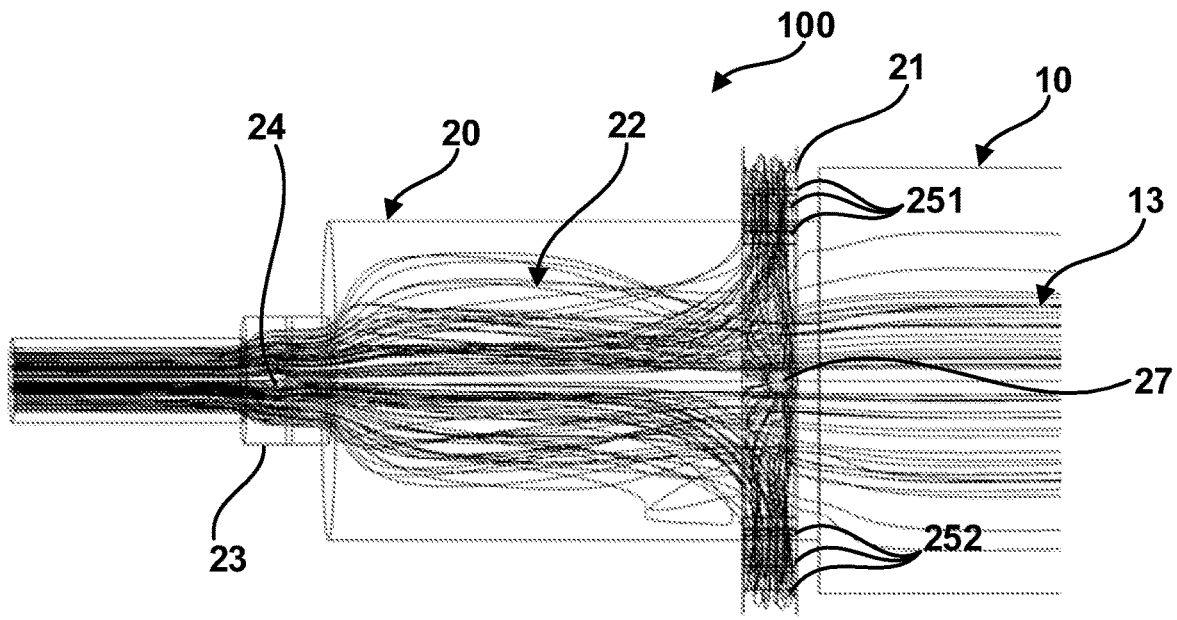

FIG. 4(B) shows, in isolation, the drift gas flow 13 in the ion mobility spectrometer 100. The drift gas flow 13 is introduced into the drift chamber 10 through the gas inlet (not shown) and flows largely in a laminar manner in the direction of the reaction chamber. After the transition into the reaction chamber 20, the drift gas flow 10 experiences a local constriction in the region of the sample gas inlet 21 due to the sample gas 22 introduced with radial flow components. Afterwards, the drift gas flow 13 continues to flow in the direction of the gas outlet 23, in which the local ionisation source 24 is arranged. Due to the significantly smaller flow cross-section of the gas outlet 23 compared to the flow cross-section of the reaction chamber 20, the drift gas flow in the gas outlet 23 and around the local ionisation source 24 is greatly increased. According to BERNOULLI, the increase results from the ratio of the flow cross-sections of reaction chamber 20 and gas outlet 23, and preferably the flow cross-section of the reaction chamber 20 is larger than the flow cross-section of gas outlet 23 at least by a factor of 2, preferably by a factor of 5 and particularly preferably by a factor of 10. FIG. 4(C) shows the total gas flow formed from the sample gas flow 22 of FIG. 4(A) and the drift gas flow 13 of FIG. 4(B). This also exhibits the flow patterns characteristic of the ion mobility spectrometer 100 of the present disclosure, in particular the absence of portions of the sample gas flow 22 overshooting radially about an axis of symmetry of the ion mobility spectrometer 100, and the increase in the total gas flow due to the diversion through the gas outlet 23 around the local ionisation source 24. The ion mobility spectrometer 100 according to the present disclosure thus achieves a high yield of ions of the sample material at the source 24. Similarly, effective transport of the ionised sample material into the drift chamber 10 is achieved, where, on the other hand, non-ionised components of the air used as drift gas are discharged from the ion mobility spectrometer 100 through the gas outlet 23. The inflow of the sample gas by means of the sample gas inlet 21 also effectively prevents non-ionised sample gas, in particular water, from entering the drift chamber 10.

Figure 6A:
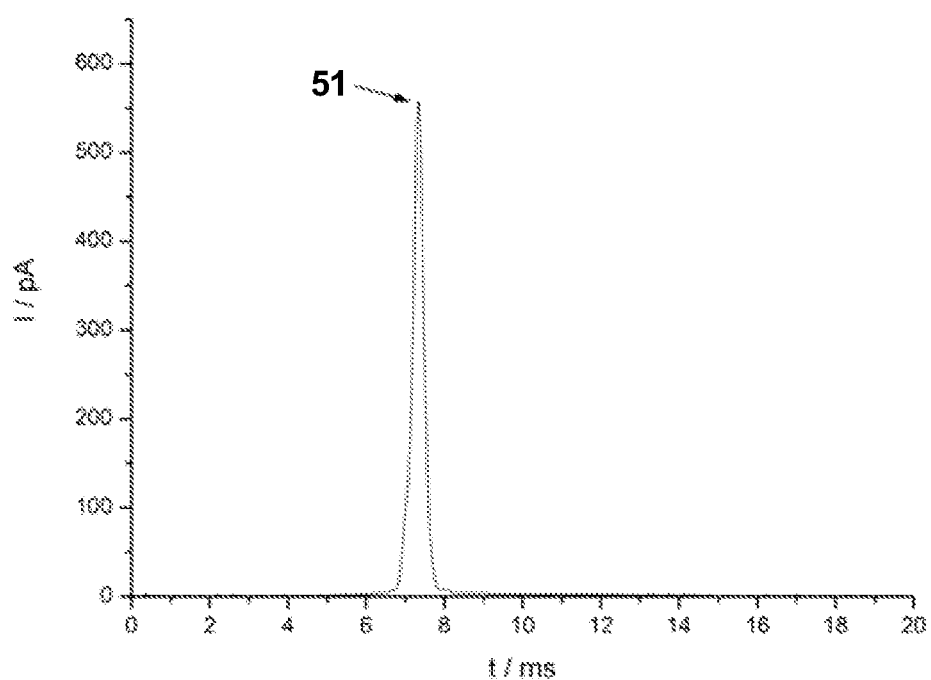
FIGS. 6(A) and 6(B) are IMS spectrums of negatively charged ions of FIG. 6(A) without and FIG. 6(B) with the presence of contaminating $NO_X$ ions in the drift chamber.

The ion mobility spectrometer 100 of the present disclosure can further advantageously be operated in two different operating modes. A first operating mode advantageously enables calibration of the ion mobility spectrometer 100 using internally generated $NO_X$ ions and a second operating module enables reference-based determination of an ion mobility spectrum for the sample material using a previously known temperature-dependent normalised ion mobility for the $NO_X$ ions. FIGS. 6(A) and (B) show drift time spectra determined with the ion mobility spectrometer 100 according to the invention with (FIG. 6(A)) and without (FIG. 6(B)) contamination of the sample gas with $NO_X$ ions. Based on these figures, the two operating modes of the IMS 100 are briefly explained below.

In the first operating mode of the ion mobility spectrometer 100 according to the present disclosure, it is operated with first operating parameters. These cause $NO_X$ ions to be formed exclusively or at least predominantly at the local ionisation source 24, for example $NO_2$ ions and/or $NO_3$ ions. For this purpose, in particular a sample gas feed is stopped or throttled, and a carrier gas supply may also be stopped or may continue to be operated. The latter option is particularly useful when using the drift gas, for example dry air, as carrier gas. Moreover, the sample gas supply and/or the drift gas supply for introducing the drift gas through the drift gas inlet 14 may be operated in such a way that a flow velocity of the total gas flow at the local ionisation source 24 is less than 50 cm/s. In addition, an operating voltage of the local ionisation source can be set above a predetermined limit voltage, which was preferably determined empirically for the ion mobility spectrometer 100 in a test stand and above which $NO_X$ ions are formed from the drift gas, in particular with a predetermined yield. By setting the first operating parameters, $NO_X$ ions are thus primarily formed at and around the local ionisation source 24, whereas ionised sample material is almost not formed at all.

Figure 6B:
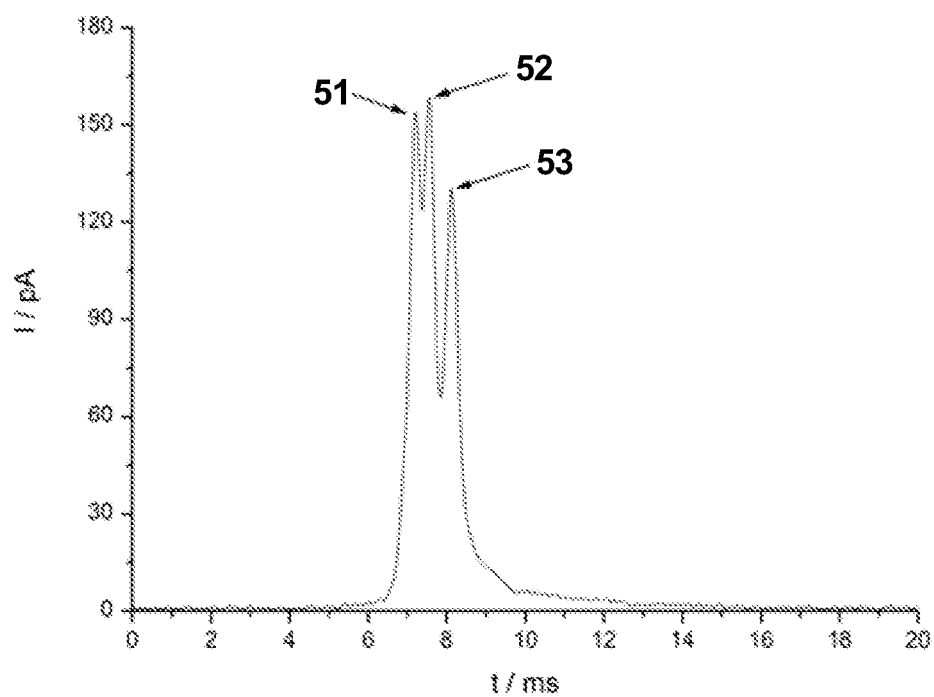

FIG. 6(B) shows two characteristic peaks 52, 53 for $NO_X$ ions in an ion mobility spectrum. The second IMS peak 52 corresponds to a value of a normalised ion mobility $K_0^{52}$ of 2.18 cm²/Vs and the third IMS peak 53 to a value of a normalised ion mobility $K_0^{53}$ of 2.00 cm²/Vs. Also shown is a first IMS peak 51 of an exemplary ionised sample material with an ion mobility $K_0^{51}$ of 2.126 cm²/Vs. By way of example, this is the peak of a primary ion or the negative reactant ion. As can be seen from FIG. 6(B), a resolution of the first IMS peak 51 is clearly hindered by the IMS peaks 52, 53 of the $NO_X$ ions. Therefore, a measurement of the IMS peak 51 should be carried out without the presence of $NO_X$ ions if possible. At the same time, the IMS peaks 52, 53 of the $NO_X$ ions can be used for a reference-based measurement of the ion mobility of the sample material by comparison with previously known values of a normalised ion mobility $K_0(T)$ of the $NO_X$ ions. The IMS peak 53 is particularly suitable for this because of its separated position. For this purpose, only the IMS peaks 52, 53 of the $NO_X$ ions and thus their drift times are determined in the first operating mode under the current measurement conditions of the ion mobility spectrometer 100, for example the current temperature. Together with the resolved IMS peak 51, that is to say the drift time, of the sample material, its ion mobility can be determined on the basis of the drift time ratio of sample material and $NO_X$ ions.

In the second operating mode of the ion mobility spectrometer 100, second operating parameters are therefore set in order to set a non-zero sample gas supply flow rate and further to increase a drift gas supply flow rate such that the flow velocity of the total gas flow at the local ionisation source is 50 cm/s or more. A corresponding flow profile of the total gas flow in the second operating mode is shown in the cross-section of the ion mobility spectrometer 100 around the local ionisation source 24 in FIG. 5, with flow velocities of the total gas flow of about 70 cm/s being achieved in the region of the local ionisation source 24. Thus, $NO_X$ compounds are advantageously discharged via the gas outlet 23. At the same time, a supply voltage of the dielectric barrier discharge source as local ionisation source 24 is set below the predetermined limit voltage, so that significantly fewer $NO_X$ ions are formed at the local ionisation source 24. In the second operating mode, therefore, advantageously almost no $NO_X$ ions enter the drift chamber 10, and consequently the drift time spectrum of FIG. 6(A) is determined. Together with the drift times of the $NO_X$ ions determined in the first operating mode in a drift time spectrum similar to that of FIG. 6(B), the ion mobility of the sample material is then determined on the basis of the drift time ratio of sample material and $NO_X$ ions as well as a previously known ion mobility $K_0(T)$ of the $NO_X$ ions. Preferably, the ion mobility spectrometer 100 is rinsed between the first and second operating mode in order to discharge the formed $NO_X$ ions as completely as possible.

REFERENCE SIGNS 1 axial direction
2 radial direction
10 drift chamber
11 switching grid
12 ion detector
13 drift gas flow
14 drift gas inlet
20 reaction chamber
21 sample gas inlet
22 sample gas
23 gas outlet
24 local ionisation source
25 gas inlets
251 first gas inlets
252 second gas inlets
26 inflow ring
27 sample gas supply line
28 flow channel
281 first flow channel
282 second flow channel
29 flow obstacle
30 potential source
31 field support ring
32 reference potential
40 radiation source (LED)
51 first IMS peak
52 second IMS peak
53 third IMS Peak
100 ion mobility spectrometer

The invention claimed is:

1. An ion mobility spectrometer for determining an ion mobility of a sample, the ion mobility spectrometer comprising:
   a cylindrical drift chamber designed for transporting ions from a switching grid to an ion detector against an axial drift gas flow; and
   a cylindrical reaction chamber adjoining the cylindrical drift chamber in the axial direction and having a sample gas inlet adjacent to the switching grid for introducing a sample gas, a gas outlet opposite the switching grid for discharging drift gas and sample gas, and a local ionisation source arranged at the gas outlet,
   wherein the sample gas inlet has oppositely arranged gas inlets on an inner circumference of the cylindrical reaction chamber.

2. The ion mobility spectrometer according to claim 1, wherein the cylindrical drift chamber and the cylindrical reaction chamber have a circular-cylindrical shape and the sample gas is supplied through the gas inlets with radial flow components.

3. The ion mobility spectrometer according to claim 2, wherein radial components of flow velocities of partial flows of the sample gas directed through oppositely arranged gas inlets compensate for one another.

4. The ion mobility spectrometer according to claim 1, wherein the sample gas inlet comprises an inflow ring running circumferentially around the cylindrical reaction chamber with at least one flow channel connecting a sample gas supply line and at least one gas inlet.

5. The ion mobility spectrometer according to claim 4, wherein the sample gas inlet comprises gas inlets which are arranged oppositely in pairs on the inner circumference of the cylindrical reaction chamber, wherein each pair of oppositely arranged gas inlets has a first gas inlet and a second gas inlet, and the sample gas supply line is connected to at least one first gas inlet via a first flow channel and to at least one second gas inlet via a second flow channel.

6. The ion mobility spectrometer according to claim 4, wherein flow obstacles are arranged in at least one flow channel for diverting a sample gas flow through the gas inlets.

7. The ion mobility spectrometer according to claim 4, wherein at least one flow channel has a plurality of gas inlets.

8. The ion mobility spectrometer according to claim 7, wherein a flow obstacle for diverting a sample gas flow is arranged between each two gas inlets.

9. The ion mobility spectrometer according to claim 8, wherein the flow obstacles are designed to level partial flows of the sample gas exiting through the gas inlets.

10. The ion mobility spectrometer according to claim 1, wherein the gas outlet has a smaller flow cross-section than at least one of the cylindrical reaction chamber and the cylindrical drift chamber.

11. The ion mobility spectrometer according to claim 1, wherein the local ionisation source is configured for a dielectric barrier discharge and/or comprising a radiation source for irradiating the local ionisation source with light having a wavelength of 280 nm to 480 nm.

12. The ion mobility spectrometer according to claim 1, further comprising at least one potential source arranged in the reaction chamber for generating an electric field for transporting ions formed at the local ionisation source towards the drift chamber.

13. The ion mobility spectrometer according to claim 1, further comprising a drift gas inlet arranged in the region of the ion detector and a drift gas supply for the controllable supply of drift gas and a sample gas supply for the controllable supply of sample gas.

14. A method for operating the ion mobility spectrometer of claim 1 to determine an ion mobility of a sample, the method comprising:
setting first operating parameters of at least one of a local ionisation source, a drift gas supply for supplying air as drift gas, and a sample gas supply of the ion mobility spectrometer for generating $NO_X$ ions at the local ionisation source and for introducing the generated $NO_X$ ions into a drift chamber of the ion mobility spectrometer;

measuring a first drift time $t_{NOX}$ of the $NO_X$ ions at the drift chamber temperature T;

setting second operating parameters of at least one of the local ionisation source, the drift gas supply, and the sample gas supply to generate sample ions without formation of $NO_X$ ions at the local ionisation source and/or to avoid the introduction of $NO_X$ ions into the drift chamber;

measuring a second drift time $t_P$ of the sample ions at the drift chamber temperature T; and determining a normalised ion mobility of the sample $K_0^P(T)$ using the measured first drift time $t_{NOX}$, the measured second drift time $t_P$, and a normalised ion mobility of the $NO_X$ ions $K_0^R(T)$ as reference according to $K_0^P(T) = t_{NOX}/t_P * K_0^R(T)$.

15. The method according to claim 14, wherein the first operating parameters set a flow rate of the sample gas supply and/or a flow rate of the drift gas supply to limit a flow velocity at the local ionisation source to below 50 cm/s and/or set a supply voltage of a dielectric barrier discharge source as local ionisation source above a predetermined limit voltage, and wherein the second operating parameters set a flow rate of the sample gas supply and/or a flow rate of the drift gas supply to set a flow rate at the local ionisation source above 50 cm/s and/or set a supply voltage of a dielectric barrier discharge source as local ionisation source below a predetermined limit voltage.

* * * * *